United States Patent
Nöhl et al.

(10) Patent No.: US 8,162,116 B2
(45) Date of Patent: Apr. 24, 2012

(54) DOUBLE CLUTCH SYSTEM

(75) Inventors: Oliver Nöhl, Bühlertal (DE); Ivo Agner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 421 days.

(21) Appl. No.: 12/378,278

(22) Filed: Feb. 11, 2009

(65) Prior Publication Data

US 2009/0223769 A1 Sep. 10, 2009

(30) Foreign Application Priority Data

Feb. 11, 2008 (DE) .......................... 10 2008 008 457

(51) Int. Cl.
*F16D 25/10* (2006.01)
*F16D 21/06* (2006.01)

(52) U.S. Cl. ................... 192/48.619; 192/48.8

(58) Field of Classification Search ............. 192/48.618, 192/48.619, 110 S
See application file for complete search history.

(56) References Cited

U.S. PATENT DOCUMENTS

| | | | | |
|---|---|---|---|---|
| 7,147,092 B2 * | 12/2006 | Friedmann | .................. | 192/48.91 |
| 7,445,108 B2 * | 11/2008 | Bauer et al. | .............. | 192/48.619 |
| 2007/0256907 A1 * | 11/2007 | Gremplini et al. | ....... | 192/48.619 |
| 2008/0271968 A1 * | 11/2008 | Metzinger et al. | ........... | 192/48.8 |

FOREIGN PATENT DOCUMENTS

EP 1 226 992 A1 7/2002

* cited by examiner

*Primary Examiner* — Richard M. Lorence
(74) *Attorney, Agent, or Firm* — Alfred J. Mangels (57) ABSTRACT

A twin clutch assembly for a drive train including a twin clutch transmission, and a drive unit coupled to the twin clutch transmission through a wet running twin multi disk clutch. A drive side output hub is non-rotatably connected with a transmission input shaft that is rotatably disposed within a hollow transmission input shaft that includes a free end facing the drive unit and is non-rotatably connected to a transmission side output hub. A clutch cover is axially disposed between the twin clutch and the drive unit, and a drive element is axially supported and is non-rotatably connected to the drive unit. The transmission side output hub is axially supported toward the transmission by an axial support device at the free end of the hollow transmission input shaft.

20 Claims, 6 Drawing Sheets

DOUBLE CLUTCH SYSTEM

BACKGROUND OF THE INVENTION

1. Field of the Invention

The present invention relates to a double clutch system in a drive train that includes a twin clutch transmission and a drive unit. The drive unit can be coupled to the twin clutch transmission through a wet-running twin clutch of multi-disk construction having a drive side output hub that is non-rotatably connected with a first transmission input shaft. The first transmission shaft is rotatably disposed within a hollow, second transmission input shaft that includes a free end facing the drive unit, and that is non-rotatably connected to a transmission side output hub. The drive train includes a clutch cover that is axially disposed between the twin clutch and the drive unit, and on which a drive element that is non-rotatably connected to the drive unit is axially supported.

2. Description of the Related Art

A twin wet clutch is a component of a power transmission system and must be axially and radially fixed in position. Various embodiments of a multiple clutch device that can be installed in a drive train as complete units are known from published European Patent Application No. EP 1 226 992 A1. The known multi-clutch device includes a twin clutch with an outer disk carrier that extends radially inwardly to an annular component, on which the outer disk carrier is non-rotatably mounted. The annular component is supported on both transmission input shafts by an axial and radial bearing arrangement, so that radial forces and also axial forces are supported at the transmission input shafts. In one known embodiment, an axial support of the input shaft is provided at the crankshaft flange, which provides an elastic assembly that includes a spring and a convex or spherical support element that are radially inwardly inserted into a support shoulder of the input hub and are radially and axially supported by the support shoulder.

In another known embodiment, the transmission input shaft is provided with an annular groove into which a resilient retaining member is inserted, which is depressed into the groove by a run up slope of the hub component during insertion.

In another known embodiment, the clutch is supported by means of a drive plate through a spring assembly and a pivot bearing at the radially inner rim portion of the clutch cover. The spring assembly elastically biases the entire clutch toward the transmission so that tolerance compensation is achieved. The cover is supported at the transmission housing by a retaining ring.

It is an object of the present invention to maintain as low as possible the assembly complexity in the transmission for fixing in position the wet running twin clutch in a cost-effectively producible twin clutch assembly.

SUMMARY OF THE INVENTION

The above-noted object is achieved by a twin clutch assembly in a drive train that includes a twin clutch transmission and a drive unit, and in which the drive unit can be coupled to the twin clutch transmission through a wet running twin clutch having a multi-disk construction. The assembly includes a drive unit side output hub that is non-rotatably connected with a transmission input shaft that is rotatably disposed within a hollow transmission input shaft. The hollow transmission input shaft includes a free end facing the drive unit, and is non-rotatably connected to a transmission side output hub. A clutch cover is axially disposed between the twin clutch and the drive unit, and axially supports a drive element that is non-rotatably connected to the drive unit. The transmission side output hub is axially supported toward the transmission by means of an axially resilient support device directly at the free end of the hollow transmission input shaft.

The terms radial and axial relate to a common axis of rotation of the transmission input shafts. Axial means in the direction of the axis of rotation or parallel to the axis of rotation. Radial means transverse to the axis of rotation.

Through the direct support at the free end of the hollow transmission input shaft, a groove for receiving the retaining ring at the free end of the transmission input shaft, which is otherwise required, can be omitted. That reduces production cost. The assembly complexity is reduced to sliding the twin clutch onto the transmission input shafts, and by applying and fixing the clutch cover. The twin clutch can be delivered to a transmission production plant as a completely assembled unit. Loose components cannot be lost during the assembly process.

A preferred embodiment of the twin clutch assembly is characterized in that the resilient support device includes a spring that is biased in the axial direction against the free end of the hollow transmission input shaft. The spring is preferably elastically and/or plastically deformable. Besides the elastic bias of the spring, a biasing is conceivable in which the spring is loaded beyond its elastic limit, and thus is plastically deformed. The plastic deformation has the advantage that greater spring travel can be achieved, while a spring force is acting simultaneously. The spring is preferably provided as a slotted wave spring having circumferential undulations.

Another preferred embodiment of the twin clutch assembly is characterized in that the spring is clamped between the free end of the hollow transmission input shaft and a retaining ring. Preferably the retaining ring and the spring engage a groove provided on the radially inner surface of the transmission side output hub.

Other preferred embodiments of the twin clutch assembly are characterized in that a respective axial bearing is disposed in the axial direction between the two output hubs, between the drive side output hub and the drive element, and/or between the drive element and the clutch cover. The axial bearings can be biased in a controlled manner by the spring.

Another preferred embodiment of the twin clutch assembly is characterized in that at least one spacer disk is disposed between the axial bearing and the clutch cover. That has the advantage that the spring can be omitted.

Another preferred embodiment of the twin clutch assembly is characterized in that the transmission side output hub is axially supported relative to the transmission by means of a retaining ring directly at the free end of the hollow transmission input shaft. The terms axial and radial relate to a common axis of rotation of the transmission input shafts. Axial means in the direction of the axis of rotation or parallel to the axis of rotation. Radial means transverse to the axis of rotation.

Another preferred embodiment of the twin clutch assembly is characterized in that the retaining ring engages a groove that is provided on the radially inner surface of the transmission side output shaft. No further spacer disks are required at that location.

Another preferred embodiment of the twin clutch assembly is characterized in that the twin clutch includes two multi-disk clutches each with an outer disk carrier that is non-rotatably connected to the drive unit through the drive element. The multi-disk clutches are preferably hydraulically actuated by actuation pistons, and they are cooled by a cooling medium that flows through the clutches.

Another preferred embodiment of the twin clutch assembly is characterized in that one of the outer disk carriers, in particular the radially outermost outer disk carrier, is disengageably but non-rotatably connected to a coupling component on the transmission side of the multi-disk clutches, wherein the coupling component non-rotatably interconnects the two outer disk carriers. In the previously known multi-clutch unit, a disengageable disconnection point is disposed on the drive unit side.

In accordance with another significant aspect of the present invention, the disengageable disconnection point is disposed on the transmission side, in particular behind a disk set. As a result of the distribution of mass that is thereby changed, among other things, the heavy steel disks are located in front of the disconnection point, and because of the frictional contact that occurs during operation, rattling noises at the disconnection point are avoided. Thus, additional support solutions are not necessary.

Another preferred embodiment of the twin clutch assembly is characterized in that the coupling component includes a radially outer collar that is bent toward the transmission. The collar significantly increases the stiffness of the coupling component.

Another preferred embodiment of the twin clutch assembly is characterized in that the twin clutch includes a piston hub that serves for axially guiding two pistons, and on which a pump drive gear is mounted. The pump drive gear is non-rotatably connected to the drive element and includes a radially outer groove for a seal for one of the pistons. The pump drive gear drives a pump that serves for providing a pressure- and/or a cooling medium.

Another preferred embodiment of the twin clutch assembly is characterized in that the pump drive gear is mounted to the piston hub by a press fit, so that at least one radial bore in the piston hub is closed by the pump drive gear. The radial bore connects two axial bores in the piston hub. The bores are part of a supply channel for supplying the twin clutch with cooling oil or pressurizing oil.

Another preferred embodiment of the twin clutch assembly is characterized in that the twin clutch includes two multi-disk clutches that each includes a multi-disk set having inner disks and outer disks. In accordance with a modular system, the twin clutch includes disk sets with different, in particular smaller or larger, numbers of disks, which can be assembled at a low assembly complexity. Starting with a baseline design, the transmittable torque of a wet clutch can be varied by the number of friction disks. In accordance with another relevant aspect of the present invention, clutch variants are provided that facilitate a variation of the number of friction disks at the lowest possible assembly complexity.

Another preferred embodiment of the twin clutch assembly is characterized in that the twin clutch includes pistons with different, in particular smaller and larger, extension in the axial direction, which can be assembled without further changes along with disk sets that include different numbers of disks. By axially extending the two pistons smaller disk set widths can be compensated.

Another preferred embodiment of the twin clutch assembly is characterized in that the twin clutch includes outer disk carriers that have axial stops with different, in particular smaller and larger, axial extensions and that can be mounted with disk sets without additional changes, wherein the disk sets include different, in particular larger or smaller, numbers of disks. Preferably, the axial stops are integrated into the outer disk carriers.

Another preferred embodiment of the twin clutch assembly is characterized in that the twin clutch includes disk sets with replacement disks that can be mounted to an inner disk carrier and which include additional replacement disks that can be mounted at the same axial installation location at an outer disk carrier of the same disk set. In order to optimize the cooling oil supply, the size and position of transverse stampings in teeth in the disk carrier can be varied.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
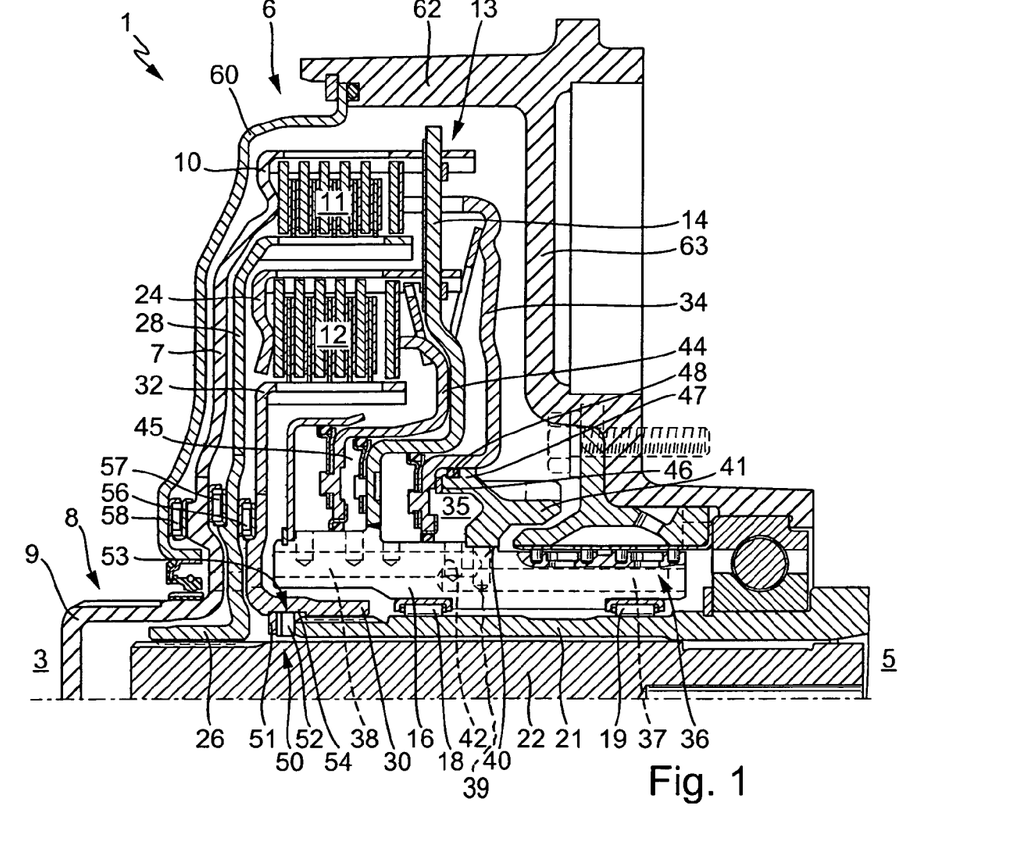
FIG. 1 is a half-sectional longitudinal view of a drive train of a motor vehicle with a twin clutch assembly in accordance with an embodiment of the present invention.

FIGS. 1 through 6 respectively show a portion of a drive train 1 of a motor vehicle. Between a drive unit 3 and a transmission 5, a twin clutch 6 of multi-disk form is disposed. The drive unit, which is only indicated by the reference numeral 3 in FIG. 1, is, for example, an internal combustion engine from which a crankshaft extends, which is preferably non-rotatably connected with an input component of the twin clutch 6, preferably with an intervening torsional vibration damper (not shown).

The clutch input component 8 includes a drive hub 9, which is also referred to as a clutch input hub. At the clutch input hub 9, a drive element 7 is mounted, which has the shape of a substantially radially outwardly extending circular annular disk, which transitions into an outer disk carrier 10 of a first multi-disk clutch assembly 11. A second multi-disk assembly clutch 12 is disposed radially within the first multi-disk clutch assembly 11. The two multi-disk clutch assemblies 11, 12 each include a respective disk set including inner disks and outer disks that can be brought into frictional engagement with each other in order to transmit torque.

The outer disk carrier 10 is disengageably and non-rotatably connected to a coupling component 14 at a disengageable disconnection point 13. In accordance with a significant aspect of the present invention, the disengageable disconnection point 13 is disposed behind the first multi-disk clutch 11, in the direction of the power flow and thus on the transmission side. The coupling component 14 is connected to a piston hub 16 by means of a weld. The piston hub 16 is rotatably supported by needle bearings 18, 19 at the outer circumference of a first transmission input shaft 21 that is in the form of a hollow shaft. In the interior of the hollow first transmission input shaft 21, a second transmission input shaft 22 is rotatably disposed, which is configured as a substantially solid shaft. The second transmission input shaft 22 extends coaxially with and within the first transmission input shaft 21.

An outer disk carrier 24 of the second multi-disk clutch assembly 12 is non-rotatably connected with the coupling component 14. The coupling component 14 non-rotatably connects the two outer disk carriers 10 and 24 with one another. The drive element 7 transmits torque between the two outer disk carriers 10, 24 and the crankshaft of the drive unit 3. With reference to the normal torque flow from the drive unit 3 to the transmission 5, the outer disk carriers 10, 24 form the input side of the two multi-disk clutch assemblies 11, 12, respectively.

An output hub 26 of an inner disk carrier 28 of the first twin clutch 11 is non-rotatably carried on the transmission input shaft 22 by means of a spline connection or the like. An output hub 30 of an inner disk carrier 32 of the second multi-disk clutch assembly 12 is non-rotatably carried in the same manner on the radially outer surface of hollow transmission input shaft 21 by means of a spline connection. With reference to the typical torque flow from the drive unit 3 toward the transmission 5, the inner disk carriers 28, 32 constitute the output sides of the first and second multi-disk clutch assemblies 11, 12, respectively.

The first multi-disk clutch assembly 11 is actuated by means of an actuation piston 34 through a hydraulic medium provided in a pressure chamber 35. The hydraulic medium is supplied to the pressure chamber 35 through a pressure medium channel 36, which includes plural axially-extending bores 37, 38 that are connected to one another through at least one radial bore 39. The pressure medium channel 36 with the axial bores 37, 38 and the radial bore 39, and other radial bores that are not specifically shown, extends through the piston hub 16 and is supplied with hydraulic medium by a hydraulic medium pump (not shown).

The radial bore 39 that connects the two axial bores 37, 38 with one another is closed by a pump drive gear 41 mounted on the radially outer surface of piston hub 16 at a location 40. Drive gear 41 is secured to the piston hub 16 by a press fit. A radial bore 42 extends radially outwardly from the axial bore 38 and opens into the pressure chamber 35. The hydraulic pump (not shown) is driven by the pump drive gear 41, which rotates at engine speed. The second multi-disk clutch assembly 12 is actuated by an actuation piston 44 by means of the hydraulic medium in a pressure chamber 45. The pressure chamber 45 is axially disposed between the coupling component 14 and the actuation piston 44.

An axial vent stop 46 for the actuation piston 34 of the first multi-disk clutch assembly 11 is mounted to the pump drive gear 41. The pump drive gear 41 furthermore forms a fixed boundary of the pressure chamber 35. The pump drive gear 41 is additionally provided with a groove 47 for receiving a seal 48. The pump drive gear 41 thus provides a seal carrier for the fixed piston seal 48. Preferably, the pump drive gear 41 is provided as a sintered component with appropriately sized teeth.

The output hub 30 is axially supported at the free end of the hollow transmission input shaft 21 by means of an axial support device 50. The axial support device 50 includes a retaining ring 51, which engages a groove 54 together with a spring 52, which groove is provided at the inner diameter 53 of the drive hub 30. The spring 52 is axially biased between the retaining ring 51 and the free end of the transmission input shaft 21, and can be a wave spring having circumferential undulations. The axial support device 50 in accordance with the present invention makes the position of the twin clutch 6 independent of the positions of and of possible linear movements of the transmission input shafts 21, 22.

An axial bearing 56 is disposed between the output hub 30 and the output hub 26. Between the output hub 26 and the drive element 7, or the drive hub 9, another axial bearing 57 is disposed. Another axial bearing 58 is disposed between the drive element 7, or the input hub 9, and a clutch cover 60. The axial bearings 56, 57, 58 can be provided as roller bearings, ball bearings, or straight bearings. The clutch cover 60 is mounted to a transmission housing 62, which includes a transmission housing rear wall 63.

Figure 2:
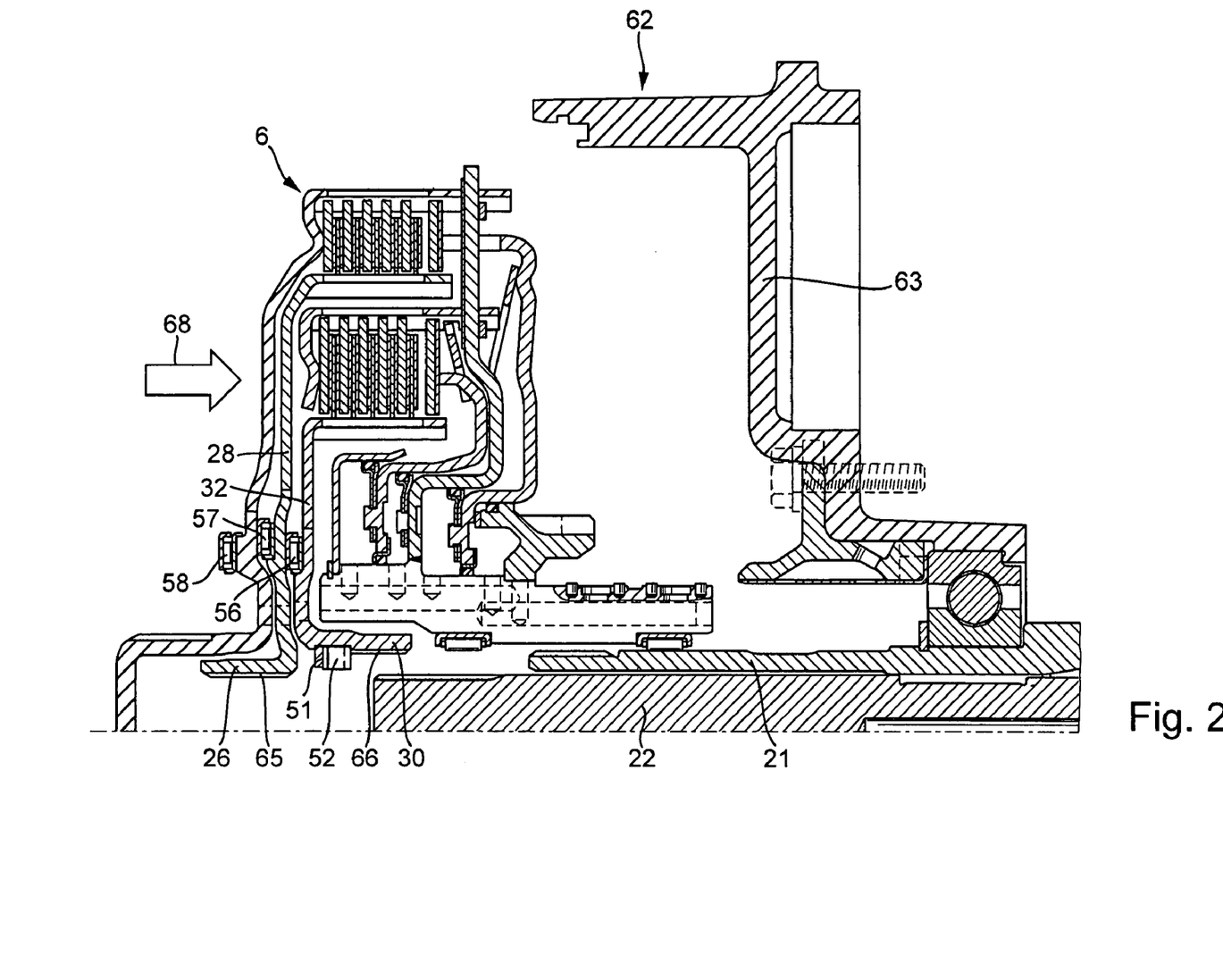
FIG. 2 is a view similar to that of FIG. 1 showing the transmission housing separated from the twin clutch unit during assembly of the twin clutch.

FIG. 2 illustrates that the assembly complexity is reduced by sliding the twin clutch 6 onto the transmission input shafts 21, 22 in the direction of arrow 68, wherein the inner teeth 65, 66 of the output hubs 26, 30, respectively, are brought into engagement with respective outer teeth of the respective transmission input shafts 21, 22. The spring 52 facilitates the controlled axial biasing of the axial bearings 56, 57, and 58. In order to facilitate assembly, the spring 52 and the retaining ring 51 are not provided in a closed form, but are provided slotted. An undesired disengagement of the components 51, 52 at high speed is prevented by disposing the two components 51, 52 at the inner diameter 53 of the output hub 30.

The twin clutch 6 shown in FIGS. 1 and 2 can be considered as a base design, in which the two multi-disk clutch assemblies 11, 12 include five outer disks and five inner disks, respectively, which can be brought into frictional engagement with one another. The torque to be transmitted can be varied by the number of friction disks.

Figure 3:
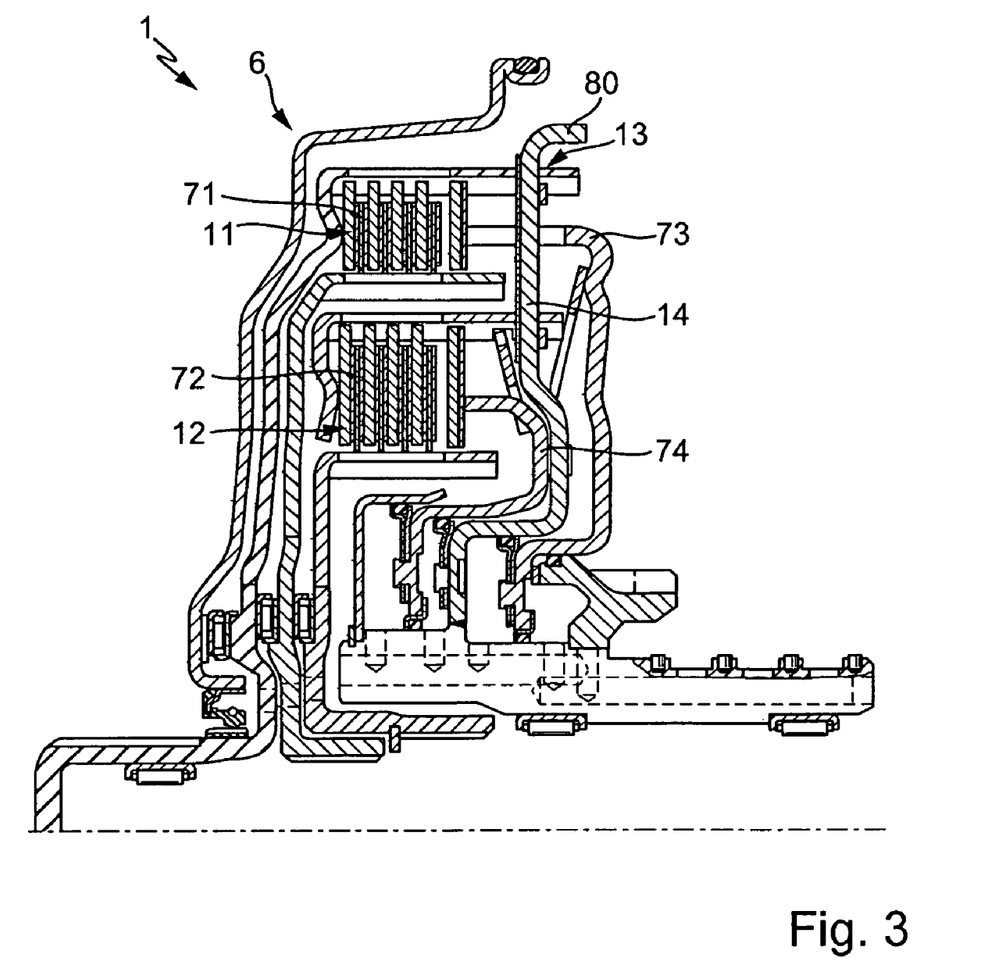
FIG. 3 is a view similar to that of FIG. 1 of a twin clutch with actuation pistons that are axially extended.
Figure 4:
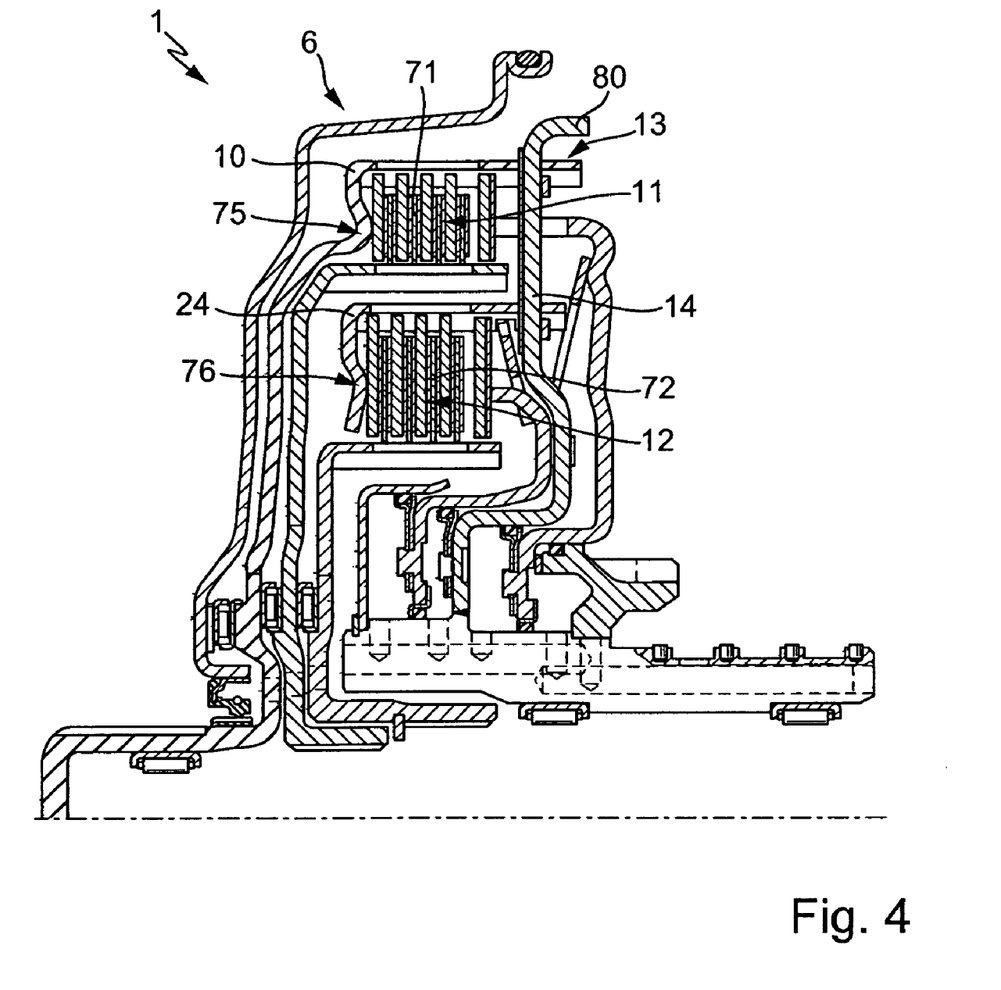
FIG. 4 is a view similar to that of FIG. 1 showing a similar twin clutch as in FIG. 1 with modified axial stops.
Figure 5:
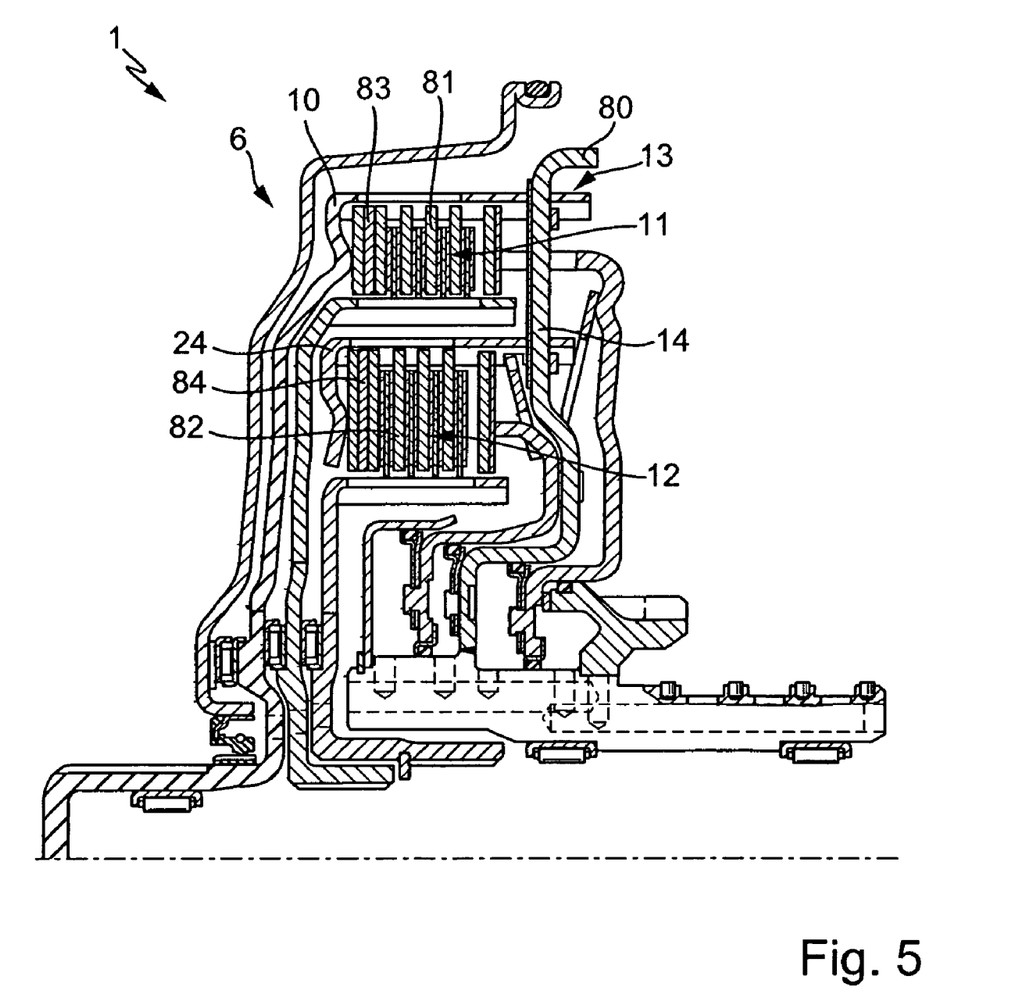
FIG. 5 is a view similar to that of FIG. 1 showing a similar twin clutch as in FIG. 1 with replacement disks.

In FIGS. 3 to 5, three exemplary embodiments are shown to illustrate how the number of the friction disks that can be brought into engagement can be changed with little change complexity. In an exemplary manner, a 5/5 friction disk variant is converted into 4/4 friction disk variant, in which four respective inner disks can be brought into frictional engagement with four respective outer disks. The width of the omitted or inoperative disks has to be compensated.

In the embodiment shown in FIG. 3, the smaller set width of the disk sets 71, 72 is achieved by axially extending the associated actuation pistons 73, 74.

In the embodiment shown in FIG. 4, the smaller set width of the disk sets 71, 72 is compensated by a matching change in the axial extent of the axial stops 75, 76. The axial stops 75, 76 are integrally formed as part of the associated outer disk carriers 10, 24 in the illustrated exemplary embodiment.

In the embodiment shown in FIG. 5, the smaller set width of disk sets 81, 82 is compensated by replacement disks 83, 84, which hang between two adjacent outer disks. The replacement disks 83, 84 do not have any effect during the operation of the twin clutch 6, but merely serve to fill in the axial extent of the friction disks that would otherwise hang on the inside at that position.

Figure 6:
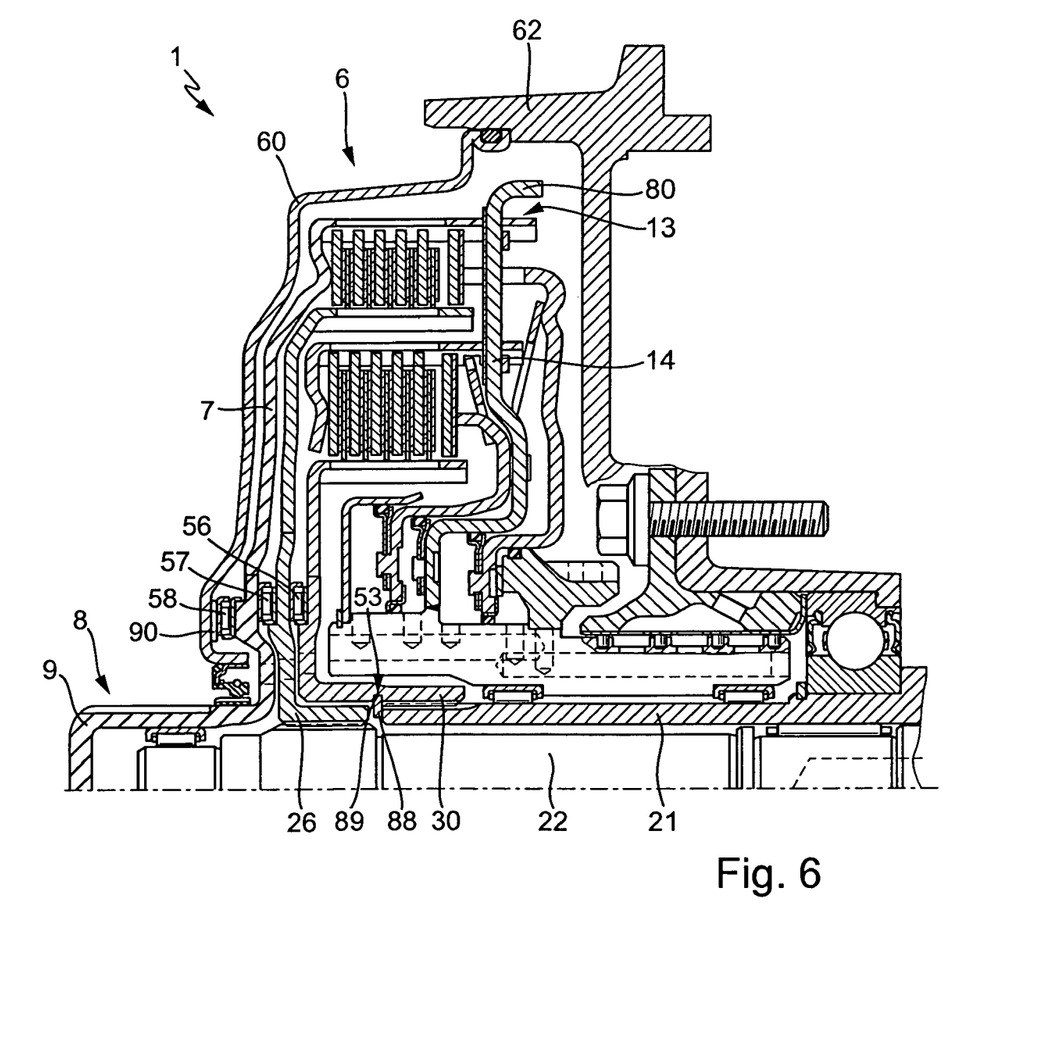
FIG. 6 is a view similar to that of FIG. 1 showing a similar twin clutch as in FIG. 1 with a spacer disk between the clutch cover and an associated axial bearing.

In FIG. 6, a similar twin clutch assembly 6 as in FIG. 1 is shown in a longitudinal half-sectional view. Identical reference numerals identify identical components. In order to avoid repetition, reference is made to the description of FIG. 1 provided above. Below are the differences between the two embodiments addressed.

In the embodiment shown in FIG. 6, no springs are used for biasing the two drive hubs 26, 30. The drive hub 30 is only supported axially by a retaining ring 88 at the free end of the hollow transmission input shaft 21. The retaining ring 88 engages a groove 89 that is provided on the radially inner surface of the drive hub 30. As hereinabove described in connection with the exemplary embodiment shown in FIG. 1, the axial bearings 56, 57, 58 can be provided as roller bearings, ball bearings, or straight bearings. Existing axial tolerances of the employed components, including the transmission input shaft 21, are compensated by at least one spacer disk 90. The spacer disk 90 is disposed between the axial bearing 58 and the clutch cover 60.

Additionally, as shown in FIGS. 3 through 6, a collar 80 is angled toward the transmission from the radially outer end of the coupling component 14. The collar 80 is used to significantly stiffen the coupling component 14, against which the contact pressure forces act. The solution only becomes possible due to the position of the disconnection point 13 on the transmission side. Because of space constraints, that would not be possible with the disconnection point located on the engine side.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A twin clutch assembly for a motor vehicle drive train that includes a transmission and a drive unit that can be coupled to the transmission by a twin clutch, said twin clutch assembly comprising:
   a first, hollow transmission input shaft that includes a free end facing the drive unit and non-rotatably connected to a transmission side output hub of the twin clutch;
   a drive side output hub of the twin clutch that is non-rotatably connected with a second transmission input shaft that is rotatably disposed within the first, hollow transmission input shaft;
   a clutch cover that is axially disposed between the twin clutch and the drive unit; a drive element axially supported by the clutch cover and non-rotatably connected to the drive unit;
   wherein the transmission side output hub is axially supported against movement toward the transmission by an axial support device that is axially biased against the free end of the hollow transmission input shaft and that includes an axially-acting spring carried by the transmission side output hub adjacent a free end of the hollow transmission input shaft that faces the drive unit.

2. A twin clutch assembly in accordance with claim 1, wherein the spring is elastically deformable.

3. A twin clutch assembly in accordance with claim 1, wherein the spring is plastically deformable.

4. A twin clutch assembly in accordance with claim 1, wherein the spring is a wave spring.

5. A twin clutch assembly in accordance with claim 1, wherein the spring is carried between the free end of the hollow transmission input shaft and a retaining ring carried by the transmission side output hub.

6. A twin clutch assembly in accordance with claim 5, wherein the retaining ring and the spring engage a groove that is provided on a radially inner surface of the transmission side output hub.

7. A twin clutch assembly in accordance with claim 1, including an axial bearing axially disposed between the drive unit side output hub and the transmission side output hub.

8. A twin clutch assembly in accordance with claim 1, including an axial bearing axially disposed between the drive unit side output hub and the drive element.

9. A twin clutch assembly in accordance with claim 1, including an axial bearing axially disposed between the drive element and the clutch cover.

10. A twin clutch assembly in accordance with claim 1, wherein the twin clutch includes two multi-disk clutches with outer disk carriers that are non-rotatably connected to the drive unit through the drive element.

11. A twin clutch assembly in accordance with claim 10, wherein one of the outer disk carriers, in particular a radially outer disk carrier, is non-rotatably connected disengageable to a coupling component on the side of the multi-disk clutches facing the transmission, wherein said coupling component non-rotatably connects the outer disk carriers to one another.

12. A twin clutch assembly in accordance with claim 11, wherein the coupling component includes a collar on the radial outside, which is angled towards the transmission.

13. A twin clutch assembly in accordance with claim 1, wherein the twin clutch includes a piston hub, which is used for axial guidance of two pistons and on which a pump drive gear is mounted, which is non-rotatably connected to the drive element, wherein the pump drive gear includes a groove on a radially-outwardly-facing surface for a seal of one of the pistons.

14. A twin clutch assembly in accordance with claim 13, wherein the pump drive gear is mounted on the piston hub through a press fit, so that at least one radial bore in the piston hub is closed by the pump drive gear.

15. A twin clutch assembly in accordance with claim 1, wherein the twin clutch includes two multi-disk clutches, each having a respective disk set that includes a respective inner disk carrier and a respective outer disk carrier.

16. A twin clutch assembly in accordance with claim 15, wherein the twin clutch includes a respective actuation piston associated with the disk sets, wherein the actuation pistons include axial extensions that are of different axial lengths for contacting a respective disk set.

17. A twin clutch assembly in accordance with claim 15, wherein each of the clutches of the twin clutch includes a respective radially outer disk carrier that includes a respective axially-extending stop, wherein the stops are of different axial extents for contacting respective disk sets.

18. A twin clutch assembly in accordance with claim 15, wherein the twin clutch includes disk sets having spacer disks carried by one of a respective inner disk carrier and respective outer disk carrier, for filling axial gaps in a respective disk set.

19. A twin clutch assembly for a motor vehicle drive train that includes a transmission and a drive unit that can be coupled to the transmission by a twin clutch, said twin clutch assembly comprising:
   a first, hollow transmission input shaft that includes a free end facing the drive unit and non-rotatably connected to a transmission side output hub of the twin clutch;
   a drive side output hub of the twin clutch that is non-rotatably connected with a second transmission input shaft that is rotatably disposed within the first, hollow transmission input shaft;
   a clutch cover that is axially disposed between the twin clutch and the drive unit; a drive element axially supported by the clutch cover and non-rotatably connected to the drive unit;
   wherein the transmission side output hub is axially supported against movement toward the transmission by an axial support device including a retaining ring carried adjacent the free end of the hollow transmission input shaft;
   an axial bearing axially disposed between the drive element and the clutch cover and at least one spacer disk disposed between the axial bearing and the clutch cover.

20. A twin clutch assembly in accordance with claim 19, wherein the retaining ring engages a groove that is provided on a radially inner surface of the transmission side output hub.

* * * * *